United States Patent [19]
Huang et al.

[11] Patent Number: 6,048,439
[45] Date of Patent: Apr. 11, 2000

[54] MODIFIED ROSIN EMULSION

[75] Inventors: Yan C. Huang, Campbell Hall; M. Bruce Lyne, Warwick; John H. Stark, Campbell Hall, all of N.Y.

[73] Assignee: International Paper Company, Purchase, N.Y.

[21] Appl. No.: 09/017,539

[22] Filed: Feb. 2, 1998

Related U.S. Application Data

[62] Division of application No. 08/639,399, Apr. 29, 1996, Pat. No. 5,741,889.

[51] Int. Cl.$^7$ .................................................. D21H 17/62
[52] U.S. Cl. ........................ 162/168.1; 162/135; 162/175; 162/180; 106/218; 106/238
[58] Field of Search ............................... 162/168.1, 180, 162/179, 175, 135; 106/218, 238, 246, 219, 215.1; 427/395

[56] References Cited

U.S. PATENT DOCUMENTS

| | | | |
|---|---|---|---|
| 2,315,675 | 4/1943 | Trommsdorff | 92/21 |
| 2,999,038 | 9/1961 | Drennen et al. | 117/155 |
| 3,419,465 | 12/1968 | Maruta | 162/168 |
| 3,520,861 | 7/1970 | Thomson et al. | 260/88.1 |
| 3,565,755 | 2/1971 | Davison | 162/168 |
| 3,644,251 | 2/1972 | Wilhelmi | 260/26 |
| 3,781,236 | 12/1973 | Bassham et al. | 260/23.7 M |
| 3,865,769 | 2/1975 | Davison | 260/27 R |
| 3,966,654 | 6/1976 | Aldrich | 260/24 |
| 4,030,970 | 6/1977 | Tominaga et al. | 162/168 R |
| 4,115,331 | 9/1978 | Tominaga et al. | 260/17.4 CL |
| 4,276,111 | 6/1981 | Karim et al. | 156/308.2 |
| 4,351,931 | 9/1982 | Armitage | 526/227 |
| 4,496,427 | 1/1985 | Davison | 162/157.5 |
| 4,501,641 | 2/1985 | Hirakawa et al. | 162/164.3 |
| 4,609,431 | 9/1986 | Grose et al. | 162/135 |
| 4,654,389 | 3/1987 | Graham et al. | 524/272 |
| 4,714,728 | 12/1987 | Graham et al. | 524/272 |
| 4,743,303 | 5/1988 | Helmer et al. | 106/236 |
| 4,943,608 | 7/1990 | Takahashi et al. | 524/272 |
| 5,093,429 | 3/1992 | Moteki et al. | 525/293 |
| 5,288,782 | 2/1994 | Nakajima et al. | 524/272 |

*Primary Examiner*—Peter Chin
*Attorney, Agent, or Firm*—Luedeka, Neely & Graham P.C.

[57] ABSTRACT

The invention disclosed herein is directed to a modified rosin emulsion, to methods for making the modified emulsion and to uses for the emulsion. The modified emulsion of the invention is made by mixing emulsified rosin solids with a water soluble salt of an alkylene-acrylic acid copolymer.

30 Claims, No Drawings

MODIFIED ROSIN EMULSION

This application is a division of application Ser. No. 08/639,399 filed Apr. 29, 1996 and now U.S. Pat. No. 5,741,889.

FIELD OF THE INVENTION

This invention relates to modified rosin emulsions, methods for producing the modified emulsions, their use in sizing compositions for papermaking processes, and to paper made with the modified rosin emulsions.

BACKGROUND OF THE INVENTION

In papermaking, a paper or paperboard product is sized by either adding a sizing agent to the pulp before forming the paper web (internal sizing) or by applying a sizing agent to the surface of the paper web (surface sizing). Sizing agents include starch solutions which may be applied to the paper at the wet end, at the size press or at the calender stack. Starch ($C_6H_{10}O_5$) is a mixture of linear (amylose) and branched (amylopectin) polymers of α-D-glucopyranosyl units and the starch solutions may be characterized as cationic or anionic depending on the functional groups which may be attached to starch.

It is common practice to include pigments, plasticizers and hydrophobic emulsions with the starch solutions as surface sizing agents. A common hydrophobic emulsion used in papermaking is rosin (which may be selected from one or more of three main types: gum rosin, wood rosin and tall oil rosin) in its crude or refined state. The rosin may be hydrogenated, polymerized, modified with formaldehyde, etc., or fortified by addition of acid groups to increase the reactivity of the rosin. Typical examples of fortifying compounds which may be used to modify the rosin include fumaric acid, maleic acid, maleic anhydride, itaconic acid, itaconic anhydride, citraconic acid, citraconic anhydride, acrylic acid, methacrylic acid and the like. Non-fortified rosin may also be used in combination with fortified rosin. Rosin-based sizing agents may have either an anionic or cationic charge characteristic for use as both an internal size and a surface size.

Commercially available rosin is a glassy, amorphous material which softens at temperatures between about 75° and 95° C. The primary components of rosin are various monocarboxylic resin acids of alkylated hydrophenanthrene structures having the empirical formula $C_{19}H_{(27-33)}COOH$. Resin acids may be divided into two general structural types, abietic and pimaric acids. Because the bulky hydrocarbon portion of a resin acid provides considerable shielding of the relatively small polar carboxyl group of the molecule, rosins can serve as a very effective hydrophobic coating for a cellulosic surface.

The rosin emulsion may be prepared by reacting rosin with an aqueous alkali. The degree of neutralization of the resin acids of the rosin may vary from 5% to 100% depending on the physical state desired for the commercial emulsion product.

An aqueous emulsion of rosin solids consists of suspended particles having a diameter of 0.1 to 0.5μ, soap micelles having a diameter of about 50 Å and individual resinate ions. The pH of the emulsified rosin is typically in the range of from about 3 to about 5.

Conventionally, the rosin emulsion used as a component of a surface sizing agent is an anionic rosin emulsion which may be added to an anionic size-press starch solution or a cationic rosin emulsion which may be added to a cationic starch solution. However, with either of these systems, poor sizing efficiency and/or unsatisfactory runnability have been observed. Deposit formation on the size-press, drier cans or calender rolls is one of the principal runnability problems reported with such sizing agents.

Accordingly, it is an object of the invention to provide an improved rosin emulsion.

Another object of the invention is to improve the surface characteristics of paper coated with a rosin-based sizing agent.

Yet another object of the invention is to increase the toner adhesion characteristics of a rosin-based surface-sized basestock.

A further object of the invention is to provide a rosin-based sizing agent which exhibits good sizing efficiency and satisfactory runnability and which is useable under alkaline or acidic papermaking conditions.

SUMMARY OF THE INVENTION

With regard to the above and other objects, the present invention provides a modified cationic rosin emulsion. The emulsion comprises water, emulsified cationic rosin solids and from about 1 to about 6% by weight relative to the rosin solids of a water soluble salt of an alkylene-acrylic acid copolymer, preferably a water soluble salt of a poly (alkylene-acrylic acid) copolymer. The amount of solids in the rosin emulsion preferably ranges from about 10 to about 40 percent by weight of the emulsion, more preferably from about 20 to about 25 percent by weight of the emulsion.

The modified cationic rosin emulsion of the invention has been found to be useful for improving the properties of surface sizing agents. For example, the modified emulsion according to the invention has been found to significantly improve the stability of the rosin emulsion and to improve the compatibility of the rosin emulsion with an anionic starch solution resulting in more efficient surface sizing. Using the modified cationic rosin emulsion in a surface size solution has also been found to improve the runnability of the paper machine by reducing the amount of undesirable deposits on machine parts such as the dryer cans and calendar rolls. Furthermore, the modified rosin emulsion of the invention may be adapted for use in alkaline or acidic processes.

Without being bound by theory, the improved properties of a surface sizing agent containing the modified rosin emulsion of the invention are believed to be due, at least in part, to the insensitivity of the rosin emulsion particles to any divalent cations in the water. It is also believed that the soluble salt of an alkylene-acrylic acid copolymer provides anionic moieties which are attracted to the surface of the cationic rosin solids. The anionic moieties increase the interaction of the rosin solids with the components of the surface size solution, for example the anionic starch matrix of the surface size solution, and, after sizing, the sized paper itself. Because the modified rosin emulsions of the invention are strongly attracted to the starch matrix, there is a dramatic reduction of deposits on the dryer cans and calender rolls used for the surface sizing of paper webs.

Advantageously, the alkylene-acrylic acid copolymer does not cause the cationic rosin to lose its overall cationic character under the treatment conditions used to modify the rosin emulsion. The cationic rosin emulsion remains cationic so that it is self-sequestering relative to divalent cations such as calcium ions which may be in the water of the starch solution.

The alkylene-acrylic acid copolymer may also stabilize a cationic rosin emulsion by reducing the average particle hydrodynamic diameter of the rosin. Unmodified rosin particles may have approximately twice the diameter of the modified rosin particles made according to the invention.

Another embodiment of the invention relates to a method for making a modified cationic rosin emulsion. The method comprises mixing water, a cationic rosin emulsion containing from about 30 to about 35 wt. % cationic rosin solids and from about 1 to about 6% by weight relative to the rosin solids in the modified rosin emulsion of a water soluble salt of a poly(alkylene-acrylic acid) copolymer under high shear mixing conditions, wherein the amount of cationic rosin solids in the modified rosin emulsion ranges from about 20 to about 25% by weight. The invention also provides a surface sizing agent for paper comprising an aqueous starch solution and the modified rosin emulsion prepared as described above.

In another embodiment, the invention provides a paper product comprising a web containing cellulosic fibers and a surface-sizing agent. The sizing agent comprises a size-press starch solution and a mixture of cationic rosin solids and a poly(alkylene-acrylic acid) copolymer present in an amount equal to from about 1% to about 6% by weight relative to the rosin solids wherein the sizing agent contains from about 10 to about 20 percent by weight total solids (starch solids plus rosin solids). The rosin solids in the sizing agent range from about 0.2 to about 2.0 percent by weight of the total weight of sizing agent. The paper product may be made according to processes known in the art.

The above and other embodiments, features and characteristics of the invention will now be described in further detail along with several illustrative examples.

DETAILED DESCRIPTION OF THE INVENTION

According to one of its aspects, the invention provides a modified cationic rosin emulsion. The modified rosin emulsion of the invention may be used for the same uses and in the same manner as other rosin emulsions, but is particularly useful as an additive for a surface sizing composition in the production of paper and board products made of cellulosic fibers. The invention is especially adapted for use in conjunction with fibrous webs containing wood pulp made by the kraft process, but may find use in other applications involving production of paper and board products made of other types of fibers.

The modified emulsion comprises cationic rosin solids, a water soluble salt of a alkylene-acrylic acid copolymer and water. As discussed in more detail below, the emulsion may contain other additives commonly found in rosin emulsions or surface sizes.

It is believed that any cationic rosin may be used for making the emulsion of the invention provided the cationic rosin used results in an emulsion having a zeta potential of +40 mV or above. An example of a cationic rosin which may be used includes, but is not limited to, Hercules HI-pHASE 35 emulsion commercially available from Hercules Incorporated of Wilmington, Del. The cationic rosins are available as emulsions or dispersions of rosin solids. Cationic rosins are particularly preferred for use in making the modified rosin emulsions of the invention because they are strongly attracted to anionic starch solutions rather than the divalent cations present in the water of the sizing solution.

Commercially available rosin emulsions generally contain approximately 35% by weight rosin solids. When used as surface size additives, such rosin emulsions are added to the surface size solution (generally starch-based sizes) in an amount sufficient to provide a surface size containing from about 0.2% to about 2.0% by weight of rosin solids. A preferred ratio of the weight of rosin solids to the weight of starch solids in the emulsion is within the range of from about 1:40 to about 1:3.

The emulsion of the invention may be, and preferably is, used as a surface size additive in the same manner as other rosin emulsions. Thus, the total solids content of the emulsion of the invention is preferably about 25 percent by weight as with conventional rosin emulsions. This allows the emulsion to be used without significant changes in the papermaking process. However, one of ordinary skill will appreciate that the amount of solids may be varied as needed for a particular papermaking process.

Rosin emulsions according to the invention are modified by mixing the cationic rosin emulsion described above with a water soluble salt of a alkylene-acrylic acid copolymer. The acrylic acid repeating unit within the copolymer may be, for example, acrylic acid or methacrylic acid. Preferred alkali metal salts of the alkylene-acrylic acid copolymer may be selected from a sodium salt of the poly(alkylene-acrylic acid) copolymer and an ammonium salt of a poly(alkylene-acrylic acid) copolymer wherein the alkylene unit of the copolymer contains from about 1 to about 4 carbon atoms. A particularly preferred poly(alkylene-acrylic acid) copolymer is a poly(ethylene-acrylic acid) (PEA) copolymer. The PEA copolymer may be obtained from The Dow Chemical Company of Midland, Mich. under the trade name PRIMACOR. The average molecular weight of the alkylene-acrylic acid copolymer preferably ranges from about 5,000 to about 10,000 Daltons and more preferably is about 8,000 Daltons. PRIMACOR copolymer is an 8000 molecular weight ($M_n$) poly(ethylene-acrylic acid) which may be solubilized by converting the acrylic acid to a sodium or ammonium salt.

The alkylene-acrylic acid copolymer used to make a water soluble salt should contain sufficient acrylic acid moieties to enable the copolymer to be dissolved in water. Preferably, the copolymer should contain at least about 20 weight percent acrylic acid units, preferably more than 25 wt. % acrylic acid units.

A soluble salt of the alkylene-acrylic acid copolymer may be conveniently prepared by stirring an alkylene-acrylic acid copolymer in a strongly alkaline solution of a suitable base as is known in the art. The base not only neutralizes the alkylene-acrylic acid copolymer, but also forms the desired water-soluble salt. For example, to form sodium salts of PEA copolymer, a poly(ethylene-acrylic acid) copolymer may be stirred into 10 wt. % aqueous sodium hydroxide solution.

Mixed salts may be prepared by mixing the acrylic acid copolymer with more than one base. If desired, after forming the PEA copolymer salts, any excess base may be neutralized by adding acid in an amount sufficient to react with the excess base which may be present. The resulting copolymer salt solution may be used as is or diluted to a desired concentration.

The water soluble salt of the alkylene-acrylic acid copolymer is present in the modified emulsion of the invention in amounts ranging from about 1 to 6% by weight relative to the amount of rosin solids present in the emulsion. Preferably, the alkylene-acrylic acid copolymer salt is from about 2 to about 4% by weight, and more preferably, from about 3 to about 4% by weight based on the amount of resin solids present in the modified emulsion.

In general, the modified emulsion of the invention need only contain emulsified cationic rosin solids and a water soluble salt of an alkylene-acrylic acid copolymer with the balance being water. However, the emulsion may contain other additives and ingredients typically used in rosin emulsions or in surface sizes for paper. For example, the emulsion may contain alum (aluminum sulphate).

An additional embodiment of the invention relates to a method for making a modified cationic emulsion. In the method, a cationic rosin emulsion containing from about 30 to about 35 wt. % rosin solids is mixed with water and from about 1 to about 6% by weight relative to the rosin solids in the modified rosin emulsion of a water soluble salt of an alkylene-acrylic acid copolymer, preferably a poly(alkylene-acrylic acid) copolymer, under high shear mixing conditions wherein the resulting modified cationic rosin emulsion contains from about 20 to about 25 percent by weight of the modified cationic rosin solids. Preferred high shear mixing conditions may be obtained by use of a rotor-stator type colloid mill.

The method for making the modified emulsion according to the invention may be conducted under batch, continuous or semicontinuous processes. Furthermore, the sequence for addition of the water, rosin emulsion and copolymer to the mixing vessel is not believed to be critical. Accordingly, the components used to make the modified rosin emulsion may be added in any order or essentially simultaneously to a mixing vessel.

As a result of mixing the components of the modified emulsion under high shear mixing conditions, the resulting modified emulsion is substantially stable and may remain substantially stable for many months. By "substantially stable" it is meant that the solids remain emulsified and very little if any rosin solids settle or separate from the bulk liquid phase during storage. Accordingly, the modified emulsion of the invention may be made and stored for long periods of time prior to use.

In practice, an exemplary method for making the modified emulsion of the invention may begin with a cationic rosin emulsion starting material containing 30% to 35% by weight rosin solids. Depending on the total amount of modified rosin emulsion to be made, the total amount of rosin solids in the emulsion is determined.

The amount of soluble salt of the alkylene-acrylic acid copolymer for the desired amount of modified emulsion is then determined. This determination is based on the desired percentage of copolymer salt in relation to the rosin solids, for example 3%, based on the amount of rosin solids in the cationic rosin emulsion starting material. The copolymer salt is preferably added to the cationic rosin emulsion starting material as an aqueous solution. The amount of copolymer salt solution added and the concentration of the copolymer salt solution should preferably be sufficient to achieve the desired amount of rosin emulsion and copolymer salt in the modified emulsion product. Where more concentrated copolymer salt solutions are used, the modified emulsion may be diluted as desired.

For example, an aqueous PEA copolymer solution may be prepared by dissolving the soluble salt of a PEA copolymer in distilled water having a pH of approximately 7. In the alternative, the PEA copolymer solution may be prepared by neutralizing an ethylene-acrylic acid copolymer with a basic solution. Any excess base in the resulting solution is preferably neutralized with an acid. After neutralization, the PEA copolymer solution may be equilibrated, preferably over night, before use in the method of the invention.

For ease of handling, the copolymer salt solution may be fed into a mixing vessel containing the cationic rosin emulsion using a peristaltic pump so that the copolymer solution is gradually introduced into the rosin emulsion over time while mixing vigorously using a high shear batch homogenizer. In order to reduce foaming and to assure substantially complete mixing, it is preferred to feed the copolymer solution into the mixing vessel below the liquid level of rosin emulsion in the vessel and as near to the homogenizer as practical. In the alternative, a rosin emulsion containing from about 30 to about 35 percent by weight solids may be added to a mixing vessel containing the copolymer solution and sufficient water to obtain a modified emulsion containing the desired final percent by weight solids.

The mixing should preferably be continued after all the copolymer solution has been added to the mixing vessel containing the rosin emulsion to ensure complete mixing and modification of the emulsion. Continued mixing for 0.5 to 2 hours or more after feeding the copolymer solution to the mixing vessel is desirable.

Some foaming may occur while mixing the cationic rosin emulsion and the copolymer solution. The foam may be removed by passing the modified cationic rosin emulsion product through a screen or by other means known in the art. For example, a defoamer, preferably a silicone defoamer, may be sprayed on top of the emulsion during or after homogenization of the mixture. A suitable silicon defoamer is available from Hercules Incorporated of Wilmington, Del. under the trade name ADVANTAGE 831.

In a papermaking process, the modified cationic rosin emulsion of the invention may be dispersed in a surface size solution, preferably a starch-based surface size solution. The surface size solution containing the modified cationic rosin emulsion of the invention may be applied to the paper web to be sized in the same manner as known surface sizes are applied to paper webs. A preferred starch-based surface size solution is an anionic size-press starch solution commercially available from Penford Products Company of Cedar Rapids, Iowa under the trade name PENFORD GUM 260.

It is preferred to apply the starch/modified rosin emulsion mixture to the web at a rate sufficient to provide a dried weight application of solids of from about 1.7 to about 4.1 pounds per 3000 square feet after water added with the mixture is driven off in the dryer. The resulting product will therefore contain a surface size according to the invention comprising starch solids in combination with cationic rosin solids modified by the copolymer salt wherein the total weight of from about 1.7 to about 4.1 pounds of solids per 3000 square feet (dry weight) with the total size solids comprising from about 2.4 to about 23.1% rosin solids modified by the presence of from about 0.07 to about 0.7 wt. % copolymer salt, any other additive solids, and the balance starch solids.

Under typical size-press operating temperatures and mixing and shearing conditions, a size-press starch solution containing the modified cationic rosin emulsion generally has a lower viscosity than one containing the same amount of an unmodified cationic rosin. Additionally, at normal size-press operating temperatures and over six decades of shear-rate ($10^{-1}$–$10^5$), the rheological behavior of a typical size-press starch solution containing the modified cationic rosin in standard amounts compare favorably with the same type of starch solution having the same amount of a water-soluble, styrene-acrylate type surface sizing agent.

Paper or paperboard products surface sized with a size-press starch solution containing the modified cationic rosin emulsion of the invention have been found to have much higher HST (Hercules Sizing Test T-530 PM-89) values than paper products surface-sized with the starch solution alone as well as products surface sized with a starch solution containing the same amount of an unmodified cationic rosin emulsion.

Using a starch surface size containing the modified cationic rosin emulsion of the invention at typical addition levels also provides paper products having higher Bristow trace lengths with 10 weight percent isopropyl alcohol than paper products surface sized with the starch solution alone and with the same level of unmodified cationic rosin emulsion in the same starch solution.

Xerographic toner adhesion and optical print density may also be improved for paper or paperboard products for conventional monochrome xerographic toners and short run color digital imaging electrophotographic toners (cyan, magenta, yellow and black) by using a typical size-press starch solution containing the modified cationic rosin emulsion of the invention as opposed to paper products surface sized with the starch solution alone or with starch and the same amount of the unmodified cationic rosin emulsion.

Analogous improvements in optical print density have been found for ink jet printers. Paper products surface sized with a size-press starch solution containing the modified cationic rosin emulsion of the invention exhibit improved ink jet print density over paper products surface-sized with the starch solution alone, and over paper products surface-sized with the same starch solution containing an unmodified cationic rosin emulsion.

Using a size-press starch solution containing a modified cationic rosin emulsion has also been found to retard size reversion and narrow sizing variations.

The following examples are provided to further illustrate various aspects of the invention, but are not intended to limit the scope of the invention in any way.

EXAMPLE 1

A reagent grade salt of a PEA copolymer (MICHEM PRIME 4983R commercially available from Michelman, Inc. of Cincinnati, Ohio) was added to a 2 liter beaker. The MICHEM PRIME 4983R is an ammonium poly(ethyleneacrylate) copolymer having a solids content of about 25 wt. % which is a salt form of PRIMACOR 5980 ($M_n$=9,900, $M_w/M_n$=3.5) available from Dow Chemical Company of Midland, Mich. Water (860.5 grams) was added to the PEA copolymer in the 2 liter beaker while stirring the mixture using a 5 centimeter magnetic stirring bar at a medium speed. Two drops of a defoamer, HERCULES ADVANTAGE 831 were added to the beaker while stirring the contents for 30 minutes.

HI-pHASE 35 cationic rosin emulsion (2140 grams) was fed into a 6 liter vessel containing a high-shear mixer, ROSS Model 19E 1001 commercially available from Charles Ross & Son Company of Hauppauge, N.Y. The high-shear mixer was operated at a speed setting of 4.

The diluted PEA solution from the 2 liter vessel was fed to the 6 liter vessel containing the HI-pHASE 35 emulsion using a peristaltic pump at a rate of about 86 mL per minute. The PEA solution was fed into the emulsion below the liquid level of emulsion in the vessel. After feeding the PEA solution into the emulsion, the mixture was homogenized for 20 minutes.

The modified emulsion was then filtered twice through 6 layers of cheese cloth to remove foam. The final solids content of the modified emulsion was 21.7% by weight of dry solids per weight of emulsion.

EXAMPLE 2

Paper base-stock having a basis weight of 87.86 grams/$m^2$, a moisture content of 5.36 wt. %, a reduced internal size so that it has an initial HST of 3 second, and no surface size starch was treated with various size-press agents including a modified cationic rosin emulsion according to the invention identified herein as SIZEALL 421. The emulsions were added to a starch surface size at a 4 wt. % (solids to starch solids) level. The starch pickup of the paper ranged from 70 to 80 pounds per ton. Each of the paper samples was calendered at room temperature under 5.5 psi (37.9 KPa) nip pressure. Table 1 shows various properties of the papers which were treated as indicated.

TABLE 1

| Sample Identification | Basis Weight (g/$m^2$) | Moisture Content (wt. %) | Caliper (mil) | Gurley Air Resistance (s/100 $cm^3$) | Sheffield Roughness (Sheffield Units) | Bristow Trace Length (mm, 10% IPA) | HST[1] with pH 7 ink (sec.) | Toner Adhesion (Crease Scale) |
|---|---|---|---|---|---|---|---|---|
| Base-stock | 87.86 | 5.36 | 4.32 | 20.37 | 59.6 | 32.0 | 2.7 | 118.6 |
| Base-stock + starch[2] | 92.50 | 4.96 | 4.82 | 15.23 | 163.5 | 29.2 | 1.5 | 85.2 |
| Base-stock + starch[2] + MSA-150[3] | 94.92 | 5.30 | 4.95 | 15.38 | 172.1 | 64.5 | 10.5 | 32.7 |
| Base-stock + starch[2] + HI-pHASE 35[4] | 93.84 | 4.36 | 4.92 | 16.26 | 162.9 | 60.5 | 72.1 | 52.2 |
| Base-stock + starch[2] + SIZEALL 421[5] | 93.60 | 5.48 | 5.02 | 15.00 | 165.1 | 113.3 | 129.9 | 30.2 |
| Base-stock + starch[2] + PEA copolymer[6] | 91.82 | S.18 | 4.89 | 16.34 | 159.4 | 35.4 | 6.5 | 79.7 |

[1]HST - size test for paper by ink resistance using the Hercules Method T-530 PM-89 (See TAPPI Test Methods 1994–1995).
[2]starch - PENFORD GUM 260, available from Penford Products of Cedar Rapids, Iowa.
[3]MSA-150 - styrene acrylate, available from Morton Company of Greenville, South Carolina.
[4]HI-pHASE 35 - cationic rosin emulsion containing polyamido amine, available from Hercules Incorporated of Wilmington, Delaware.
[5]SIZEALL 421 - modified cationic rosin emulsion according to the invention.
[6]PEA copolymer - Polyethylene acrylate having a number average molecular weight of about 8000.

As can be seen in Table 1, the base-stock had an extremely low level of (or almost no) internal sizing and had an HST value of 2.7 seconds. A surface-size consisting of PENFORD GUM 260 anionic starch alone had little effect on the HST values of the paper. Some improvement was obtained when a styrene acrylate (MSA-150) or PEA copolymer was added to the starch size. Paper treated with HI-pHASE 35 exhibited a significant increase in the HST values over the base stock.

When cationic rosin emulsions were added into the starch solution, the HST values and Bristow trace lengths increased as compared to the base-stock containing starch alone. However, a modified cationic rosin emulsion according to the invention (SIZEALL 421) had a synergistic increase in HST and Bristow Trace Length values above the arithmetic average of these values for the HI-pHASE 35 and PEA copolymer when each was used with a starch solution. The cationic rosin emulsion according to the invention also out-performed the commercially available, water-soluble styrene acrylate (MSA-150).

For toner-adhesions assessments, the narrower the crease, the smaller the crease number, and therefore the stronger the toner adhesion. Compared to the bare base-stock and the base-stock with the starch alone, the addition of various emulsions to the starch solution improved the toner adhesion to some degree. However, the greatest increase in toner adhesion was obtained by using the modified cationic rosin emulsion of the invention with the starch size.

As can be seen by the comparison of paper properties in Table 1, use of a modified cationic rosin emulsion according to the invention resulted in a higher HST value, a longer Bristow wheel trace length, and stronger toner adhesion than sizing agents containing other additives.

In order to determine the runnability of sizing agents according to the invention, size-press starch (PENFORD GUM 260) solution and size-press starch solutions containing a rosin emulsion were run on a paper machine. The size-press starch solution containing the modified rosin emulsion according to the invention was run three hours at 2 wt. % total rosin solids and for two hours at 4 wt. % total rosin solids. Good paper-machine runnability was achieved with the size-press formulation containing the modified rosin emulsion of the invention. Furthermore, the surface size containing the modified rosin emulsion of the invention remained stable under the mixing and shearing conditions in the starch run tank and ran cleanly at the size press. The results of the foregoing example are given in Table 2.

TABLE 2

| Sample Identification | Starch Pickup (lb/ton) | Toner Adhesion (Crease Scale) | HST with pH 7 ink (sec.) | Bristow Trace Length (mm, 10% IPA) |
|---|---|---|---|---|
| Base-stock + starch | 167 | 69 | 97 | 99 |
| Base-stock + starch + SIZEALL-421 (2 wt. % solids) | 169 | 63 | 118 | 129 |
| Base-stock + starch + SIZEALL-421 (4 wt. % solids) | 170 | 50 | 176 | 163 |

All the data in Table 2 was averaged from multiple measurements. The addition of a modified rosin emulsion to a starch surface sizing agent according to the invention brought about an improvement in the sizing capability of the paper, shown as increases in HST values and/or Bristow trace lengths. Bristow trace lengths above 120 mm tested with 10 wt. % isopropyl alcohol (IPA) are normally considered as good surface-sizing capability. Along with the improvement in the sizing capability, toner adhesion to the paper surfaces was also enhanced by use of the modified rosin emulsion with a starch press-size.

Tests were also performed to determine the effects of the modified rosin emulsion sizing agent on ink-jet printability. Higher monochrome black print optical density (1.2 versus 1.1) and lower ink winking (4 versus 5 on a scale of from 0 to 10 with 0 being no winking) were achieved when the paper surface was sized with a surface size agent containing the modified rosin emulsion according to the invention than paper sized with a conventional starch solution. Optical density measurements were made according to the following American National Standards Institute, Inc. (ANSI) tests:

ANSI PH2.17—American National Standard, Density Measurement—geometric conditions for reflection density; and ANSI PH2.18—American National Standard, Density Measurement—Spectral Conditions. This standard defines the Status responses for densitometers, such as Status T and Status A.

Ink winking characteristics were determined in accordance with the Paper Acceptance Criteria set forth for Hewlett Packard DESKJET 500C printers (1st Edition, Hewlett Packard, Nov. 30, 1992).

Having now described various embodiments and features of the invention, it will be appreciated by those of ordinary skill that the invention may be capable of numerous modifications, rearrangements and substitutions within the spirit and scope of the appended claims.

What is claimed is:

1. A modified cationic rosin emulsion consisting essentially of water, emulsified cationic rosin solids and from about 1 to about 6% by weight relative to the rosin solids of a water soluble salt of a alkylene-acrylic acid copolymer.

2. The modified rosin emulsion of claim 1 wherein the water soluble salt is an alkali metal salt of a alkylene-acrylic acid copolymer wherein the alkylene group contains from about 2 to about 4 carbon atoms.

3. The modified rosin emulsion of claim 2 wherein the water soluble salt is a sodium salt of a poly(alkylene-acrylic acid) copolymer wherein the alkylene group contains from about 2 to about 4 carbon atoms.

4. The modified rosin emulsion of claim 3 wherein the poly(alkylene-acrylic acid) copolymer is comprised of a poly(ethylene-acrylic acid) copolymer.

5. The modified rosin emulsion of claim 1 wherein the water soluble salt is an ammonium salt of a poly(alkylene-acrylic acid) copolymer wherein the alkylene group contains from about 2 to about 4 carbon atoms.

6. The modified rosin emulsion of claim 5 wherein the poly(alkylene-acrylic acid) copolymer is comprised of a poly(ethylene-acrylic acid) copolymer.

7. The modified rosin emulsion of claim 1 wherein the emulsified cationic rosin solids are comprised of cationic tall oil rosin solids.

8. The modified rosin emulsion of claim 1 wherein the modified emulsion contains from about 20 to about 25% by weight of rosin solids.

9. A paper or board product sized with a sizing agent containing the modified cationic rosin emulsion of claim 1.

10. A sizing agent for surface-sizing a formed fibrous paper web which consists essentially of an aqueous mixture of starch, cationic rosin solids, and from about 1 to about 6% by weight relative to the rosin solids of a water soluble salt of a poly(alkylene-acrylic acid) copolymer.

11. The sizing agent of claim 10 wherein the aqueous starch solution is an anionic size-press starch solution.

12. The sizing agent of claim 10 wherein the water soluble salt is an alkali metal salt of a poly(alkylene-acrylic acid) copolymer wherein the alkylene group contains from about 2 to about 4 carbon atoms.

13. The sizing agent of claim 12 wherein at least a portion of the salt is coated on the rosin.

14. The sizing agent of claim 12 wherein the water soluble salt is a sodium salt of a poly(alkylene-acrylic acid) copolymer.

15. The sizing agent of claim 10 wherein the water soluble salt is an ammonium salt of a poly(alkylene-acrylic acid) copolymer wherein the alkylene group contains from about 2 to about 4 carbon atoms.

16. The sizing agent of claim 15 wherein the poly(alkylene-acrylic acid) copolymer comprises of a poly(ethylene-acrylic acid) copolymer.

17. The sizing agent of claim 14 wherein the poly(alkylene-acrylic acid) copolymer comprises of a poly(ethylene-acrylic acid) copolymer.

18. The sizing agent of claim 10 wherein the emulsified cationic rosin solids comprise of cationic tall oil rosin solids.

19. The sizing agent of claim 10 wherein the aqueous starch solution contains a modified rosin emulsion sufficient to provide from about 2 to about 20 percent by weight modified rosin solids per starch solution solids.

20. A papermaking process comprising the step of surface sizing a paper web with the surface sizing agent as claimed in claim 19.

21. A fibrous web surface-sized with the sizing agent of claim 10.

22. The sizing agent of claim 10 wherein the starch solution contains modified rosin solids made by mixing water, a cationic rosin emulsion containing from about 30 to about 35 wt. % cationic rosin solids and from about 1 to about 6% by weight relative to the rosin solids of a water soluble salt of a poly(alkylene-acrylic acid) copolymer under high shear mixing conditions wherein the amount of cationic rosin solids in the modified emulsion ranges from about 20 to about 25 percent by weight.

23. The sizing agent of claim 22 wherein the starch solution is an anionic size-press starch solution.

24. The sizing agent of claim 23 wherein the water soluble salt is an ammonium salt of a poly(alkylene-acrylic acid) copolymer wherein the alkylene group contains from about 2 to about 4 carbon atoms.

25. A paper or paperboard product which comprises a web containing cellulosic fibers surface-sized with from about 1.7 to about 4.1 dry pounds per 3000 square feet of a sizing agent consisting essentially of an anionic size-press starch containing cationic rosin solids and from about 1 to about 6% by weight of a salt of a poly(alkylene-acrylic acid) copolymer relative to the weight of the rosin solids.

26. The paper or paperboard product of claim 25 wherein the salt is a sodium salt of a poly(ethylene-acrylic acid) copolymer.

27. The paper or paperboard product of claim 25 wherein the salt is an ammonium salt of a poly(ethylene-acrylic acid) copolymer.

28. The paper or paperboard product of claim 25 wherein the anionic size-press starch solution contains from about 2.4 to about 23.1 wt. % modified rosin solids based on the weight of starch solids.

29. The paper or paperboard product of claim 25 wherein the size-press starch contains modified rosin solids wherein the modified rosin solids are made by mixing water, a cationic rosin emulsion containing from about 30 to about 35 wt. % cationic rosin solids and from about 1 to about 6% by weight relative to the rosin solids of a water soluble salt of a poly(alkylene-acrylic acid) copolymer under high shear mixing conditions, wherein the amount of cationic rosin solids in the modified emulsion ranges from about 20 to about 25 percent by weight and wherein the alkylene group contains from about 2 to about 4 carbon atoms.

30. The paper or paperboard product of claim 29 wherein the salt is an ammonium salt of a poly(ethylene-acrylic acid) copolymer.

* * * * *